United States Patent
Choi et al.

(10) Patent No.: US 6,464,822 B1
(45) Date of Patent: Oct. 15, 2002

(54) ANTIREFLECTION FILM

(75) Inventors: Hyung-Chul Choi, Lexington; Robert L. Jones, Andover; Pradnya V. Nagarkar, Newton; William K. Smyth, Sudbury; Xiaojia Z. Wang, Acton, all of MA (US); Yee Ho Chia, Troy, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/026,271

(22) Filed: Feb. 19, 1998

(51) Int. Cl.⁷ .............................................. B32B 31/26
(52) U.S. Cl. ............................ 156/307.1; 156/307.4; 156/308.6; 156/314
(58) Field of Search ...................... 428/328, 336, 428/331, 447; 427/164, 166; 350/163, 165; 156/307.1, 307.3, 307.4, 308.6, 314

(56) References Cited

U.S. PATENT DOCUMENTS

| | | | |
|---|---|---|---|
| 3,793,022 A | 2/1974 | Land et al. ................... 96/3 |
| 3,925,081 A | 12/1975 | Chiklis ......................... 96/72 |
| 4,047,804 A | 9/1977 | Stephens ................... 350/164 |
| 4,066,814 A | 1/1978 | Chiklis ........................ 428/333 |
| 4,070,097 A | 1/1978 | Gelber ....................... 350/165 |
| 4,234,654 A | 11/1980 | Yatabe et al. ............... 428/333 |
| 4,320,169 A | 3/1982 | Yatabe et al. ............... 428/333 |
| 4,361,598 A | 11/1982 | Yoldas ........................ 427/74 |
| 4,386,130 A | 5/1983 | Hayashi et al. ............. 428/215 |
| 4,422,721 A | 12/1983 | Hahn et al. ................. 350/164 |
| 4,465,736 A * | 8/1984 | Nishihara et al. ........... 428/332 |
| 4,747,674 A | 5/1988 | Butterfield et al. ......... 350/399 |
| 4,765,729 A * | 8/1988 | Taniguchi ................... 351/163 |
| 4,940,602 A | 7/1990 | Taniguchi et al. ........... 427/40 |
| 4,904,525 A | 12/1990 | Taniguchi et al. .......... 428/328 |
| 5,061,769 A | 10/1991 | Aharoni ...................... 526/245 |
| 5,106,671 A | 4/1992 | Amberger et al. .......... 428/215 |
| 5,118,579 A | 6/1992 | Aharoni et al. ............. 428/422 |
| 5,139,879 A | 8/1992 | Aharoni et al. ............. 428/422 |
| 5,171,414 A | 12/1992 | Amberger et al. ..... 204/192.26 |
| 5,178,955 A | 1/1993 | Aharoni et al. ............. 428/421 |
| 5,198,267 A | 3/1993 | Aharoni et al. ............. 427/162 |
| 5,225,244 A | 7/1993 | Aharoni et al. ............. 427/240 |
| 5,234,748 A | 8/1993 | Demirymont et al. ...... 428/216 |
| 5,392,156 A | 2/1995 | Kumagai et al. ........... 359/586 |

(List continued on next page.)

FOREIGN PATENT DOCUMENTS

| | | |
|---|---|---|
| EP | 0300661 | 1/1989 |
| EP | 0 749 021 | 12/1996 |
| EP | 0924537 A1 | 6/1999 |
| JP | 63228101 A | 9/1988 |
| JP | 404338901 A | 11/1992 |
| WO | WO96/31343 | 10/1996 |
| WO | WO98/07056 | 2/1998 |
| WO | WO99/42860 | 8/1999 |

OTHER PUBLICATIONS

Derwent Abstracts of Japanese Application Publication (Kokai) No. 63–248,807.

(List continued on next page.)

Primary Examiner—Merrick Dixon
(74) Attorney, Agent, or Firm—Stephen W. Buckingham

(57) ABSTRACT

An antireflection coating includes one or more inorganic antireflection layers (typically metal oxide or silica layers) and a polymer layer cured in situ, the polymer layer having a refractive index not greater than about 1.53 over the wavelength range of 400 to 700 nm and a thickness of from about 20 to about 200 nm. The polymer layer provides good scratch and fingerprint protection, and also enables the thicknesses of the inorganic antireflection layers to be reduced, thereby reducing the cost of the coating.

19 Claims, 1 Drawing Sheet

U.S. PATENT DOCUMENTS

| | | | |
|---|---|---|---|
| 5,409,777 A | 4/1995 | Kennedy et al. | 428/411.1 |
| 5,449,558 A | 9/1995 | Hasegawa et al. | 428/422 |
| 5,514,526 A | 5/1996 | Nishi et al. | 430/325 |
| 5,693,366 A | 12/1997 | Mase et al. | 427/164 |
| 5,763,061 A | 6/1998 | Ochiai et al. | 428/215 |
| 5,783,049 A | 7/1998 | Bright et al. | 204/192.14 |
| 5,820,957 A | 10/1998 | Schroeder et al. | 428/40.1 |

OTHER PUBLICATIONS

Southwall Technologies, "Thin Film Coatings . . . ", SID International Symposium and Exhibition, San Diego CA, May 1996.

Derwent Abstract of Japanese Application Publication (Kokai) No. 63–248,807.

Southwall Technologies, "Thin Film Coatings. . .", SID International Symposium and Exhibition, San Diego CA, May 1996.

SID 96 Applications Digest, Society for Information Display International Symposium Digest of Applications Papers, "Linear Polarizer Advancements with the Use of Hydrophobic Multilayer Thin–Film Coating Technology," M.D. Parish et al. 1996 pp. 25–28.

Derwent Abstract of Japanese Application Publication (Kokai) No. 63–248,807.

PCT Search Report WO 0031570, PCT/US99/26229, dated Feb. 28, 2000.

* cited by examiner

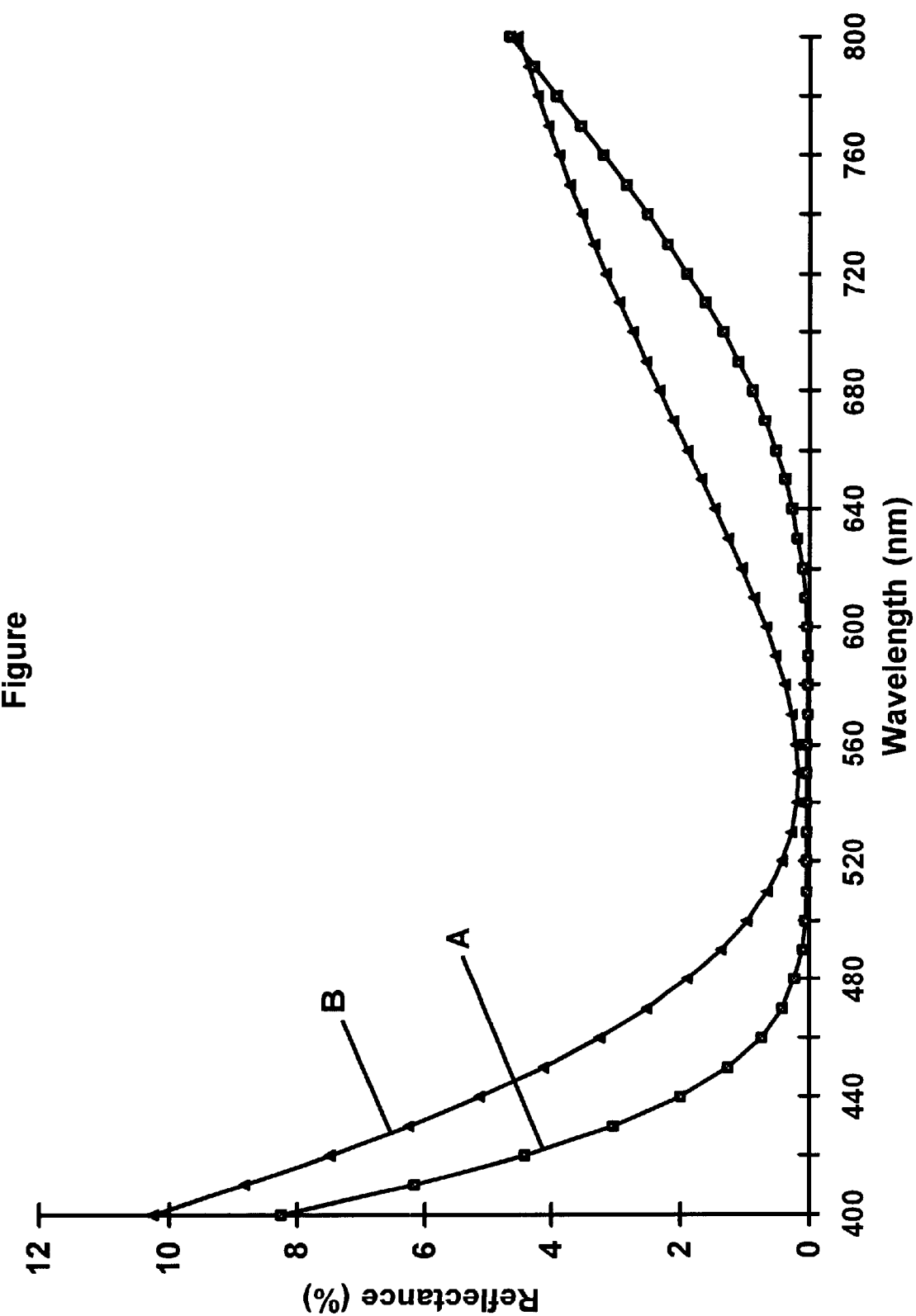
Figure

ANTIREFLECTION FILM

BACKGROUND OF THE INVENTION

This invention relates to a process for providing an antireflection film on a substrate, and to the article formed by this process.

It has long been known that it is advantageous to provide various articles, for example lenses, cathode ray tubes, flat panel displays, window films and windshields, with antireflection films which reduce the amount of light reflected from the surface of the article and thus reduce or eliminate "ghost" images formed by such reflected light. For example, U.S. Pat. Nos. 5,106,671; 5,171,414 and 5,234,748 describe antireflection films which are placed on the inside surface of automobile windshields to reduce the intensity of the image of the instrument panel caused by light reflected from the inside surface of the windshield.

Antireflection coatings on a substrate typically comprise a plurality of inorganic layers, for example a metal or metal oxide layer and a silica layer. (The term "silica" is used herein in accordance with its normal meaning in the antireflection art to mean a material of the formula $SiO_x$ where x is not necessarily equal to two. As those skilled in the art are aware, such silica layers are often deposited by chemical vacuum deposition or sputtering of silicon in an oxygen atmosphere, so that the material deposited does not precisely conform to the stoichiometric formula $SiO_2$ of pure silica.) Typically, one surface of a silica layer is exposed, and this exposed surface, which has a high surface energy, as shown by its low contact angle with water, is highly susceptible to fingerprints and other marks. Such marks are extremely difficult to clean, often requiring the use of chemical cleaners.

U.S. Pat. No. 4,765,729 (Taniguchi) describes an antireflection optical article, which comprises a substrate bearing a single-layer or multi-layer anti-reflection film having a surface film composed of an inorganic substance, and a coating of an organic substance containing a curing material formed on the surface of the anti-reflection film, wherein the surface reflectance of the optical article is lower than 3% and the stationary contact angle to water is at least 60°. The inorganic substance is preferably silica and the preferred curing material is a silanol-terminated polysiloxane. According to this patent, the thickness of the organic substance should be in the range of 0.0005 to 0.5 $\mu$m (0.5 to 500 nm), especially 0.001 to 0.3 $\mu$m (1 to 300 nm). The provision of the layer of organic substance is stated to increase the scratch and stain resistance of the optical article.

However, this patent gives no directions for controlling the thickness of the organic substance within the very broad range which it suggests for such thickness, and all of the worked examples use a dip coating technique which would lead to very thin coatings the thickness of which would be expected to vary significantly over the surface of the coated substrate, since the coating solution will accumulate at the lowest point on the substrate. Furthermore, in these worked examples, a substrate such as a lens is first provided with antireflection layers of metal oxide and silica to a total thickness of $\lambda/4$ and then the organic substance is applied by dip coating. In these circumstances, proper antireflection properties will be obtained only if the organic substance is very thin, less than 10 nm, so that it has essentially no effect on the optical properties of the antireflection coating, and as already indicated, it is difficult to achieve uniformity in such very thin coatings.

Perhaps the most effective antireflection film available commercially is that sold by Southwall Technologies, 1029 Corporation Way, Palo Alto, Calif. 94303. This material comprises a 180 $\mu$m poly(ethylene terephthalate) substrate provided with an abrasion-resistant hard coat, and then successively with a 17 nm indium tin oxide (ITO) layer, a 23 nm silica layer, a 95 nm ITO layer, an 84 nm silica layer and finally a thin "lubrication" layer, which is formed from a fluoropolymer and is stated to improve the scratch resistance and the susceptibility of the surface to marking.

This complex film possesses excellent antireflection characteristics, but is so expensive (approximately US$10 per square foot, US$100 m$^{-2}$) as to preclude its use in many applications where antireflection films are desirable. Much of the high cost of this film can be attributed to the 95 nm ITO layer and 84 nm silica layer; since these layers are typically formed by sputtering, and the cost of a sputtered layer is directly proportional to its thickness. Furthermore, if it is desired to produce large quantities of such a complex film on a production line basis, the need for four separate sputtering stations, all of which must be maintained under high vacuum, results in a complex and costly apparatus.

It has now been found that providing a "thick" (i.e., optically active) polymer layer of carefully controlled refractive index above an inorganic antireflection layer or layers, the thickness(es) of the inorganic layer(s) can be greatly reduced, thereby reducing the overall cost of the antireflection coating, especially when the inorganic layer(s) is/are applied by a process such as sputtering or chemical vapor deposition in which the residence time of the substrate within the coating apparatus is directly proportional to the thickness of the required layer. Also, an antireflection coating using such a thick polymer layer, which can readily be applied with good uniformity by solution or other coating techniques, has good scratch and stain resistance.

SUMMARY OF THE INVENTION

Accordingly, this invention provides an article having an antireflection film. This article comprises a substrate carrying an inorganic antireflection layer, and in contact with the antireflection film and forming the outer surface of the antireflection film, a polymer layer formed by curing a curable composition in situ on the inorganic antireflection layer, the polymer layer having a refractive index not greater than about 1.53 over the wavelength range of 400 to 700 nm and a thickness of from about 20 to about 200 nm.

This invention also provides a process for providing an antireflection film on a substrate. This process comprises depositing an inorganic antireflection layer on the substrate; depositing a layer of a curable composition on the inorganic antireflection layer; and effecting free radical curing of the deposited curable composition to form a polymer layer having a thickness of from about 20 to about 200 nm and a refractive index not greater than about 1.53 over the wavelength range of 400 to 700 nm.

In the present process, the curing of the curable composition may be effected by cross-linking of one or more polymers or oligomers, or by polymerization of one or more monomers or oligomers, or by a combination of both cross-linking and polymerization. Such curing techniques are familiar to those skilled in polymer technology.

BRIEF DESCRIPTION OF THE DRAWING

The accompanying drawing shows reflectance curves for two preferred antireflection films of the present invention prepared in the Example below.

DETAILED DESCRIPTION OF THE INVENTION

As already indicated, the article of the present invention is provided with an antireflection film comprising one or more inorganic antireflection layers and an outer polymer layer. The polymer layer has a thickness of from about 20 to about 200 nm and a refractive index not greater than about 1.53 over the visible wavelength range of 400 to 700 nm, and is formed on the inorganic antireflection layer(s) by depositing a layer of a curable composition and then curing this layer in situ. The relatively thick layer of curable composition required can be applied with good uniformity by solution coating or other conventional coating techniques. Also, the provision of the thick polymer layer enables the thickness, and thus the cost, of the inorganic antireflection layers to be reduced. For example, one embodiment of the invention described below comprises a 19 nm indium tin oxide layer, a 20 nm silica layer and an 85 nm polymer layer; as compared to the Southwall Technology antireflection film described above, this embodiment of the invention reduces the amount of material which needs to be sputtered per unit area of the film by about 80 percent, thus reducing the cost of the film by more than 50 percent.

The substrate of the present article can be any material on which an antireflection coating is desired, provided of course that the substrate can withstand the (relatively mild) conditions needed for deposition of the various layers and the curing of the curable composition. The substrate may be a finished optical article, for example a lens, the display surface of a cathode ray tube, or an automobile windshield. However, in most cases it is preferred that the substrate be a plastic film, typically a polyester film; the plastic film has the antireflection coating formed thereon, and the resultant antireflection film may be applied to, for example, a cathode ray tube, a flat panel display, window glass or a windshield, which it is desired to provide with antireflection characteristics. Suitable polyester films are readily available commercially, for example the 4 to 7 mil (101 to 177 μm) poly(ethylene terephthalate) films sold under the trademark "MELINEX" by ICI Americas Inc., Wilmington, Del.

Especially when the substrate is a plastic film, it may be provided with coatings on one or both surfaces to improve its hardness and scratch resistance, to improve the adhesion of the inorganic antireflection layer to the substrate, or to provide any other desired properties, for example filtration of ultra-violet radiation or provision of a gas and/or moisture barrier. A hard coating on the substrate will typically have a thickness of about 1 to about 15 μm, preferably from about 2 to about 3 μm, and such a hard coating may be provided by free radical polymerization (initiated either thermally or by ultra-violet radiation) of an appropriate polymerizable material. An especially preferred hard coat for use in the present invention is the acrylic polymer coating sold under the trademark "TERRAPIN" by Tekra Corporation, 6700 West Lincoln Avenue, New Berlin, Wis. 53151.

As already indicated, the article of the present invention may include one or more than one inorganic antireflection layers. These layers may be formed from any of the inorganic materials hitherto used in antireflection coatings. The preferred materials for forming the inorganic antireflection layer on which the curable composition is deposited are metal oxides and silica layer. Preferred metal oxides are indium oxide, titanium dioxide, cadmium oxide, gallium indium oxide, niobium pentoxide, indium tin oxide and tin dioxide, with indium tin oxide being especially preferred.

As will be apparent to those skilled in thin film optics and the design of antireflection coatings, the thicknesses of the inorganic antireflection layer(s) and the polymer layer in the present article should be correlated so that the total thickness of these layers is approximately $\lambda/4$ of the center of the wavelength range for which antireflection characteristics are desired, e.g., the total thickness should be approximately 135–145 nm when antireflection characteristics are desired over the entire visible range of 400 to 700 nm. Also, the thicknesses of the inorganic antireflection layer(s) and the polymer layer can be adjusted relative to one another to produce minimum reflectivity from the composite film.

In one preferred article of the present invention having a metal oxide layer in contact with the polymer layer, this metal oxide layer is the sole inorganic antireflection layer and has a thickness of about 10 to about 30 nm, desirably about 17 to about 23 nm, while the accompanying polymer layer has a thickness of about 80 to about 150 nm, desirably about 110 to about 130 nm. This preferred article combines low production cost with good antireflection properties.

A second preferred article of the present invention having a metal oxide layer in contact with the polymer layer comprises a first metal oxide layer, a silica layer superposed over the first metal oxide layer, and a second metal oxide layer superposed on the silica layer, the polymer layer being superposed on the second metal oxide layer. In this structure, the first metal oxide layer desirably has a thickness of from about 20 to about 35 nm, preferably about 25 to 30 nm, the silica layer desirably has a thickness of from about 10 to about 25 nm, preferably about 15 to about 20 nm, the second metal oxide layer desirably has a thickness of from about 50 to about 100 nm, preferably about 65 to about 80 nm, and the polymer layer desirably has a thickness of from about 70 to about 120 nm, preferably about 85 to about 100 nm. This preferred three inorganic layer structure provides antireflection performance substantially equal to that of the Southwall Technology four inorganic layer structure discussed above, while still providing a substantial reduction in production costs, since the thick silica layer and the thin lubrication layer of the four inorganic layer structure are eliminated.

When the inorganic layer in contact with the polymer layer is a silica layer, a preferred article of the invention comprises a metal oxide layer on the substrate and a silica layer superposed on the metal oxide layer, the polymer layer being superposed on the silica layer. In such a two inorganic layer structure, desirably the metal oxide layer has a thickness of from about 10 to about 30 nm, preferably about 10 to about 20 nm, the silica layer desirably has a thickness of from about 10 to about 120 nm, preferably about 10 to about 50 nm, and the polymer layer desirably has a thickness of from about 50 to about 130 nm, preferably about 60 to about 100 nm.

Although other techniques, for example e-beam and thermal evaporation may be employed to deposit the inorganic layers of the present article, these layers are preferably deposited by sputtering or by chemical vapor deposition, with dc sputtering being especially preferred, although RF, magnetron and reactive sputtering and low-pressure, plasma-enhanced and laser-enhanced chemical vapor deposition may also be used. When the preferred plastic film substrates are used, the deposition of each of these layers should of course be effected at a temperature which does not cause damage to the plastic substrate; this temperature limit of course varies with the exact plastic substrate employed.

As already indicated, the polymer layer of the present antireflection coating has a refractive index not greater than about 1.53 over the wavelength range of 400 to 700 nm and a thickness of from about 20 to about 200 nm. The preferred thickness range for this layer is about 50 to about 130 nm, preferably about 60 to about 100 nm. Polymer layers having thicknesses within these ranges are readily prepared by depositing a solution of an appropriate curable material in an organic solvent using conventional solution coating techniques, for example slot coating, removing the solvent and curing the resultant layer of curable material.

It is desirable to keep the refractive index of the polymer layer as low as possible consistent with other acceptable properties for this layer, especially hardness and scratch and stain resistance. The polymer should also be resistant to cleaning solvents which may be used on the film, for example ethyl alcohol, aqueous ammonia, acetone, gasoline and isopropanol, and food and cosmetic items, for example peanut butter and lipstick with which it may come into contact. Finally, the polymer should also have good durability, as measured, for example by its ability to withstand rubbing with steel wool. Desirably, the polymer layer has a refractive index below about 1.50 over the entire visible range of 400 to 700 nm. To provide a suitably low refractive index, the curable composition used to form the polymer layers desirably comprises a polymer of a fluoroalkene, for example poly(vinylidene fluoride) or a vinylidene fluoride/tetrafluoroethylene copolymer, such as the material sold under the trademark "KYNAR" by San Diego Plastics, Inc., 2220 McKinley Avenue, National City, Calif. 91950. However, since a polymer layer consisting only of a fluoroalkene polymer will typically be too soft to give good scratch protection, it is also desirable that the curable composition include an alkyl acrylate or methacrylate polymer, such as the material sold under the trademark "ELVACITE 2041" by ICI Acrylics, Inc., 3411 Silverside Road-McKean 2nd, Wilmington, Del. 19850-5391, or that sold under the trademark "ACRYLOID A21" by Rohm and Haas, 100 Independence Mall West, Philadelphia, Pa. 19106-2399. To promote cross-linking within the polymer layer, and thus increase the hardness of this layer, it is advantageous to include a polyfunctional acrylate monomer ("polyfunctional" being used herein in its conventional sense to denote a material having a functionality of 3 or higher) in the curable composition; a specific preferred polyfunctional acrylate monomer is that sold under the trademark "SR 399" by Sartomer, Inc., 502 Thomas Jones Way, Exton, Pa. 19341; this material is stated by the manufacturer to be dipentaerythritol pentaacrylate.

It is well known to those skilled in polymer science that most polymers have a negative dispersion with the visible range, i.e., their refractive index at 700 nm is smaller than their refractive index at 400 nm. Calculations show that such negative dispersion adversely affects the antireflection properties of the film and hence it is desirable to reduce such negative dispersion as far as possible. The aforementioned KYNAR polymer has a low refractive index and small negative dispersion, which render it very suitable for use in the present curable composition. While the desirability of a fluoroalkene polymer to provide low refractive index in the polymer layer and for an acrylate or methacrylate cross-linker to provide hardness in the same layer might suggest that the properties of the polymer layer must inevitably involve a compromise between the two properties, it has been found that, if the formulation of the curable composition is carefully chosen, segregation of material occurs spontaneously during curing, resulting in a polymer layer having an outer portion enriched in the acrylate or methacrylate polymer (and thus of enhanced hardness) and an inner portion enriched in the fluoroalkene polymer (and thus of reduced refractive index). An additional benefit of such segregation of acrylate or methacrylate polymer material during curing is that it enables the cross-linking to occur in an oxygen-containing atmosphere, such as air, thereby avoiding the need for a nitrogen blanket as is customary during thin film ultra-violet curing, and thus reducing the cost of manufacture of the antireflection film.

The curable composition may be cured by any conventional method, but is desirably cured by a free radical curing, which may be initiated either thermally or by ultra-violet radiation, although the latter is generally preferred. Persons skilled in polymer technology will be familiar with appropriate initiators, oxygen scavengers and other components useful in such free radical curing. However, it should be noted that, because of the extreme thinness of the polymer layer desired in the present process, the type and proportion of initiator(s) required may differ from typical formulations intended for production of thicker polymer layers.

Preferred embodiments of the present invention will now be described, though by way of illustration only, to show preferred reagents, conditions and techniques used in the present process.

EXAMPLE 1

In the preferred process, a 4 mil (101 $\mu$m) poly(ethylene terephthalate) film was solvent coated on one surface with the aforementioned TERRAPIN acrylic polymer coating, the solvent was allowed to evaporate and the film was placed under an ultra-violet lamp to cure the polymer. The coated surface of the film was then coated by direct current sputtering (chemical vapor deposition may alternatively be used) with a 19 nm layer of indium tin oxide and then with a 20 nm layer of silica.

A liquid curable composition was then prepared having the following composition (the proportions are by dry weight of the solution):

|  | % by weight |
|---|---|
| Poly(vinylidene fluoride) (KYNAR) | 46.8 |
| Methyl methacrylate (ACRYLOID A21) | 6.9 |
| Dipentaerythritol pentaacrylate (Sartomer SR 399) | 30.7 |
| Multifunctional acrylate monomer (Sartomer CD9051) | 3.0 |
| Coating additive (COATOSIL 3503[1]) | 4.0 |
| Adhesion promoter (SILANE A174[1]) | 1.0 |
| Curing initiator (DARACURE 1173[2]) | 2.0 |
| Curing initiator (QUANTACURE BMS[3]) | 4.0 |
| Oxygen scavenger (DIDMA[4]) | 1.6 |

Notes:
[1] Both available from OSi Specialties, 39 Old Ridgebury Road, Danbury, Connecticut 06810-5121.
[2] Available from Ciba-Geigy Corporation, 540 White Plains Road, P.O. Box 2005, Tarrytown, New York 10591-9005.
[3] Manufactured by Great Lakes Chemical Corporation, and available from Biddle Sawyer Corporation, 2 Penn Plaza, New York, New York 10121.
[4] Available from Aldrich Chemical Corporation, 1001 West St. Paul, Milwaukee, Wisconsin 53233.

The various components were prepared as stock solutions in methyl ethyl ketone (MEK), at 20 percent w/w, except that the ACRYLOID A21 and QUANTACURE BMS were prepared at 10 percent w/w, and the DARACURE and DIDMA were prepared at 5 percent w/w. The requisite quantities of the various stock solutions were then mixed, together with sufficient additional MEK to give 2000 g of a coating solution containing 2.75 percent solids w/w. This coating solution was then coated via a slot coater on to the film bearing the metal oxide and silica layers, the solvent allowed to evaporate and the film placed under an ultra-violet lamp to produce a polymer coating approximately 85 nm thick.

The resultant antireflection article of the present invention had a low surface reflection, and exhibited good resistance to scratching with steel wool or fingerprinting. The article had a contact angle with water of approximately 89°, in contrast to the contact angle of 14–26° for a bare silica surface with no polymer coating.

EXAMPLE 2

Example 1 was repeated, except that only a 20 nm layer of indium tin oxide was deposited on the substrate (provided with the hard coat) and that the thickness of the polymer layer formed was 120 nm.

EXAMPLE 3

Example 1 was repeated, except that there were deposited successively on the substrate (provided with the hard coat) a 27.5 nm layer of indium tin oxide, a 17.5 mn layer of silica, a 73 nm layer of indium tin oxide, and a 94 nm layer of the same polymer as in Example 1.

The accompanying drawing shows reflectance curves for two preferred films of the invention:

Curve A

A two inorganic layer structure prepared in the same manner as in Example 1 but having a 19 nm indium tin oxide layer, a 40 nm silica layer and an 82.5 nm polymer layer.

Curve B

The film prepared in Example 3 above. From these Curves, it will be seen that both films displayed very good antireflection characteristics, with the more expensive three inorganic layer film of Example 3 displaying a reflectance below 1.5 percent over the range of 450–700 nm. (Later experiments with similar films have produced reflectance as low as 0.8 percent over this wavelength range.) The photopic reflectance value for Curve A (measured according to CIE 1931, which specifies a weighted average of the reflectance over the spectral range of 450 to 650 nm centered at 550 nm and weighted mostly highly at this wavelength) was 0.609 percent, while the corresponding value for Curve B was 0.085 percent. (The 40 nm silica layer used in the film which produced Curve A minimized the photopic reflectance value of the film. However, decreasing the thickness of the silica layer to 20 nm only increases this value only to 0.610 percent, and the cost reduction associated with the reduced silica thickness is such that in practice the 20 nm thickness used in Example 1 is preferred.)

It will be apparent to those skilled in the relevant art that numerous changes and modifications can be made in the preferred embodiment of the invention described above without departing from the scope of the invention. For example, the metal oxide layer might be replaced by a layer of a different material which can bond to and form an antireflection coating with silica. The polymer layer described above could then be formed on the silica surface in the manner already described.

What is claimed is:

1. A process for providing an antireflection film on a substrate, the process comprising:
   depositing an inorganic antireflection layer on the substrate;
   depositing a layer of a curable composition on the inorganic antireflection layer; and
   effecting free radical curing of the deposited curable composition to form an optically active polymer layer having a thickness of from approximately 20 to approximately 200 nm and a refractive index not greater than approximately 1.53 over the wavelength range of 400 to 700 nm.

2. A process according to claim 1 wherein the inorganic antireflection layer is formed from a metal oxide.

3. A process according to claim 2 wherein the metal oxide is selected from the group consisting of indium oxide, titanium dioxide, cadmium oxide, gallium indium oxide, niobium pentoxide, indium tin oxide, tin dioxide and mixtures thereof.

4. A process according to claim 2 wherein a single layer of the metal oxide having a thickness of from approximately 10 to approximately 30 nm is deposited on the substrate and a polymer layer having a thickness of from approximately 80 to approximately 150 nm is formed on this single metal oxide layer.

5. A process according to claim 4 wherein the metal oxide layer has a thickness in the range of from approximately 17 to approximately 23 nm and the polymer layer has a thickness of from approximately 110 to approximately 130 nm.

6. A process according to claim 2 wherein a first metal oxide is deposited on the substrate; a silica layer is deposited on the first metal oxide layer; a second metal oxide layer is deposited on the silica layer, and the polymer layer is formed on the second metal oxide layer.

7. A process according to claim 6 wherein the first metal oxide layer has a thickness of from approximately 20 to approximately 35 nm, the silica layer has a thickness of from approximately 10 to approximately 25 nm, the second metal oxide layer has a thickness of from approximately 50 to approximately 100 nm and the polymer layer has a thickness of from approximately 70 to approximately 120 nm.

8. A process according to claim 7 wherein the first metal oxide layer has a thickness of from approximately 25 to approximately 30 nm, the silica layer has a thickness of from approximately 15 to approximately 20 nm, the second metal oxide layer has a thickness of from approximately 65 to approximately 80 nm and the polymer layer has a thickness of from approximately 85 to approximately 100 nm.

9. A process according to claim 1 wherein the inorganic antireflection layer is formed from silica.

10. A process according to claim 9 wherein a metal oxide layer is deposited upon the substrate, a silica layer is deposited on the metal oxide layer and the polymer layer is formed on the silica layer.

11. A process according to claim 10 wherein the metal oxide layer has a thickness of from approximately 10 to approximately 30 nm, the silica layer has a thickness of from approximately 10 to approximately 120 nm and the polymer layer has a thickness of from approximately 50 to approximately 130 nm.

12. A process according to claim 11 wherein the metal oxide layer has a thickness of from approximately 10 to approximately 20 nm, the silica layer has a thickness of from approximately 10 to approximately 50 nm and the polymer layer has a thickness of from approximately 60 to approximately 100 nm.

13. A process according to claim 1 wherein the polymer layer has a refractive index not greater than approximately 1.50 over the wavelength range of 400 to 700 nm.

14. A process according to claim 1 wherein the curable composition comprises a polymer of a fluoroalkene.

15. A process according to claim 1 wherein the curable composition comprises a polymer of an alkyl acrylate or methacrylate.

16. A process according to claim 1 wherein the curable composition comprises a polyfunctional acrylate monomer.

17. A process according to claim 14 wherein the curable composition comprises both a polymer of a fluoroalkene and a polymer of an alkyl acrylate or methacrylate, and wherein the curing causes segregation of material within the polymer layer, thereby producing a polymer layer having an outer portion enriched in the alkyl acrylate or methacrylate and an inner portion enriched in the fluoroalkene.

18. A process according to claim 1 further comprising depositing a hard coat on the substrate before the inorganic antireflection layer is deposited thereon.

19. A process according to claim 1 wherein the curing of the curable composition is conducted in air.

* * * * *